(12) United States Patent
Si et al.

(10) Patent No.: US 12,253,764 B1
(45) Date of Patent: Mar. 18, 2025

(54) ARRAY SUBSTRATES AND DISPLAY PANELS

(71) Applicant: Guangzhou China Star Optoelectronics Semiconductor Display Technology Co., LTd., Guangdong (CN)

(72) Inventors: Shuaichen Si, Guangdong (CN); Fen Long, Guangdong (CN); Jun Li, Guangdong (CN); Bichan Zhao, Guangdong (CN); Dexuan Huang, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/412,952

(22) Filed: Jan. 15, 2024

(30) Foreign Application Priority Data

Dec. 5, 2023 (CN) .......................... 202311658307.6

(51) Int. Cl.
*G02F 1/1343* (2006.01)
*G02F 1/1362* (2006.01)

(52) U.S. Cl.
CPC .. *G02F 1/134309* (2013.01); *G02F 1/136286* (2013.01)

(58) Field of Classification Search
CPC .................................................... G02F 1/1343
See application file for complete search history.

(56) References Cited

U.S. PATENT DOCUMENTS

| | | | |
|---|---|---|---|
| 2010/0315377 A1* | 12/2010 | Chang | G06F 3/042 345/175 |
| 2011/0310035 A1* | 12/2011 | Kim | G06F 3/0445 345/173 |
| 2013/0044092 A1* | 2/2013 | Park | G06F 3/04184 345/207 |
| 2014/0362064 A1* | 12/2014 | Kuo | G02F 1/136286 345/206 |
| 2023/0288765 A1* | 9/2023 | Yang | G02F 1/136213 |

* cited by examiner

*Primary Examiner* — Sang V Nguyen
(74) *Attorney, Agent, or Firm* — PV IP PC; Wei Te Chung (57) ABSTRACT

An array substrate and a display panel including a plurality of pixels, a plurality of scan line groups and a plurality of data lines, each of the pixels includes at least three sub-pixels, each of the scan line group includes three sub-scan lines, one of the scan line groups is provided between adjacent two of the pixel rows, and at least two of the sub-pixels in each of the pixels are connected to different two of the sub-scan lines in the one of the scan line groups, one of the pixel columns is provided between adjacent two of the data lines, and at least two of the sub-pixels in each of the pixels are connected to a same one of the data lines.

20 Claims, 6 Drawing Sheets

Prior art

ARRAY SUBSTRATES AND DISPLAY PANELS

CROSS-REFERENCE TO RELATED APPLICATION

This application claims priority to and the benefit of Chinese Patent Application No. 202311658307.6, filed on Dec. 5, 2023, the disclosure of which is incorporated herein by reference in its entirety.

TECHNICAL FIELD

The present disclosure relates to display technologies, and in particular, to array substrates and display panels.

BACKGROUND

A Liquid Crystal Display (LCD) panel usually includes scan lines extending along the row direction and data lines extending along the column direction. The scan lines and data lines are insulated and cross to define a plurality of pixel areas, and each of the pixel areas is provided with a sub-pixel. In the row direction, every adjacent three sub-pixels constitute a pixel. All the sub-pixels in the same row are connected to the same scan line, and all the sub-pixels in the same column are connected to the same data line. In this way, each pixel needs to correspond to three data lines, which causes the LCD panel to require more data lines and in turn require more source driver chips, resulting in a higher cost of the LCD panel.

SUMMARY

Embodiments of the present disclosure provide an array substrate, which includes a substrate, a plurality of sub-pixels, a plurality of scan line groups, and a plurality of data lines. The plurality of pixel arrays are arranged in an array on the substrate, the plurality of pixels are arranged in pixel rows in a first direction and are arranged in pixel columns in a second direction, each of the pixels includes at least three sub-pixels, and the three sub-pixels are arranged along the first direction. The plurality of scan line groups are provided on the substrate, each of the scan line groups includes three sub-scan lines extending along the first direction and spaced apart along the second direction, one of the scan line groups is provided between adjacent two of the pixel rows, and at least two of the sub-pixels in each of the pixels are connected to different two of the sub-scan lines in the one of the scan line groups. The plurality of data lines are provided on the substrate and spaced apart along the first direction, each of the data lines extends along the second direction, one of the pixel columns is provided between adjacent two of the data lines, and at least two of the sub-pixels in each of the pixels are connected to a same one of the data lines.

Embodiments of the present disclosure also provides a display panel, which includes an array substrate and an opposed substrate disposed oppositely each other. The array substrate includes a substrate, a plurality of sub-pixels, a plurality of scan line groups, and a plurality of data lines. The plurality of pixel arrays are arranged in an array on the substrate, the plurality of pixels are arranged in pixel rows in a first direction and are arranged in pixel columns in a second direction, each of the pixels includes at least three sub-pixels, and the three sub-pixels are arranged along the first direction. The plurality of scan line groups are provided on the substrate, each of the scan line groups includes three sub-scan lines extending along the first direction and spaced apart along the second direction, one of the scan line groups is provided between adjacent two of the pixel rows, and at least two of the sub-pixels in each of the pixels are connected to different two of the sub-scan lines in the one of the scan line groups. The plurality of data lines are provided on the substrate and spaced apart along the first direction, each of the data lines extends along the second direction, one of the pixel columns is provided between adjacent two of the data lines, and at least two of the sub-pixels in each of the pixels are connected to a same one of the data lines. The opposed substrate includes a color resist layer, the color resist layer includes a plurality of color resist blocks provided corresponding to the plurality of the sub-pixels, and three of the color resist blocks corresponding to the three sub-pixels have different colors. The color resist blocks corresponding to a same one of the sub-scan lines have a same color, the scan line groups include a plurality of first sub-scan lines, a plurality of second sub-scan lines, and a plurality of third sub-scan lines, and the color resist blocks corresponding to the three sub-scan lines respectively have different colors, the three sub-scan lines include a first sub-scan line, a second sub-scan line, and a third sub-scan line arranged sequentially along the second direction. The color resist blocks corresponding to two of the first sub-scan lines of adjacent two of the scan line groups have a same color, or, the color resist blocks corresponding to two of the second sub-scan lines of adjacent two of the scan line groups have a same color, or, the color resist blocks corresponding to two of the third sub-scan lines of adjacent two of the scan line groups have a same color.

BRIEF DESCRIPTION OF THE DRAWINGS

In order to explain the technical solutions in the embodiments or the prior art more clearly, a brief introduction to the drawings used in the description of the embodiments or the prior art will be provided below. Obviously, the drawings in the following description only show some embodiments of the present disclosure. For those skilled in the art, other drawings can be obtained based on these drawings without exerting creative efforts.

DETAILED DESCRIPTION

The following description of the embodiments refers to the accompanying drawings to illustrate specific embodiments in which the present disclosure may be implemented. The directional terms mentioned in the present disclosure, such as [upper], [lower], [front], [back], [left], [right], [inner], [outer], [side], etc., only refer to the direction of the accompanying drawings. Therefore, the directional terms used are used to explain and understand the present disclosure, rather than to limit the present disclosure. In the drawings, units with similar structures are represented by the same reference numbers. In the drawings, the thickness of some layers and regions are exaggerated for clarity of understanding and ease of description. That is, the size and thickness of each component shown in the drawings are arbitrarily shown, but the disclosure is not limited thereto.

Figure 2:
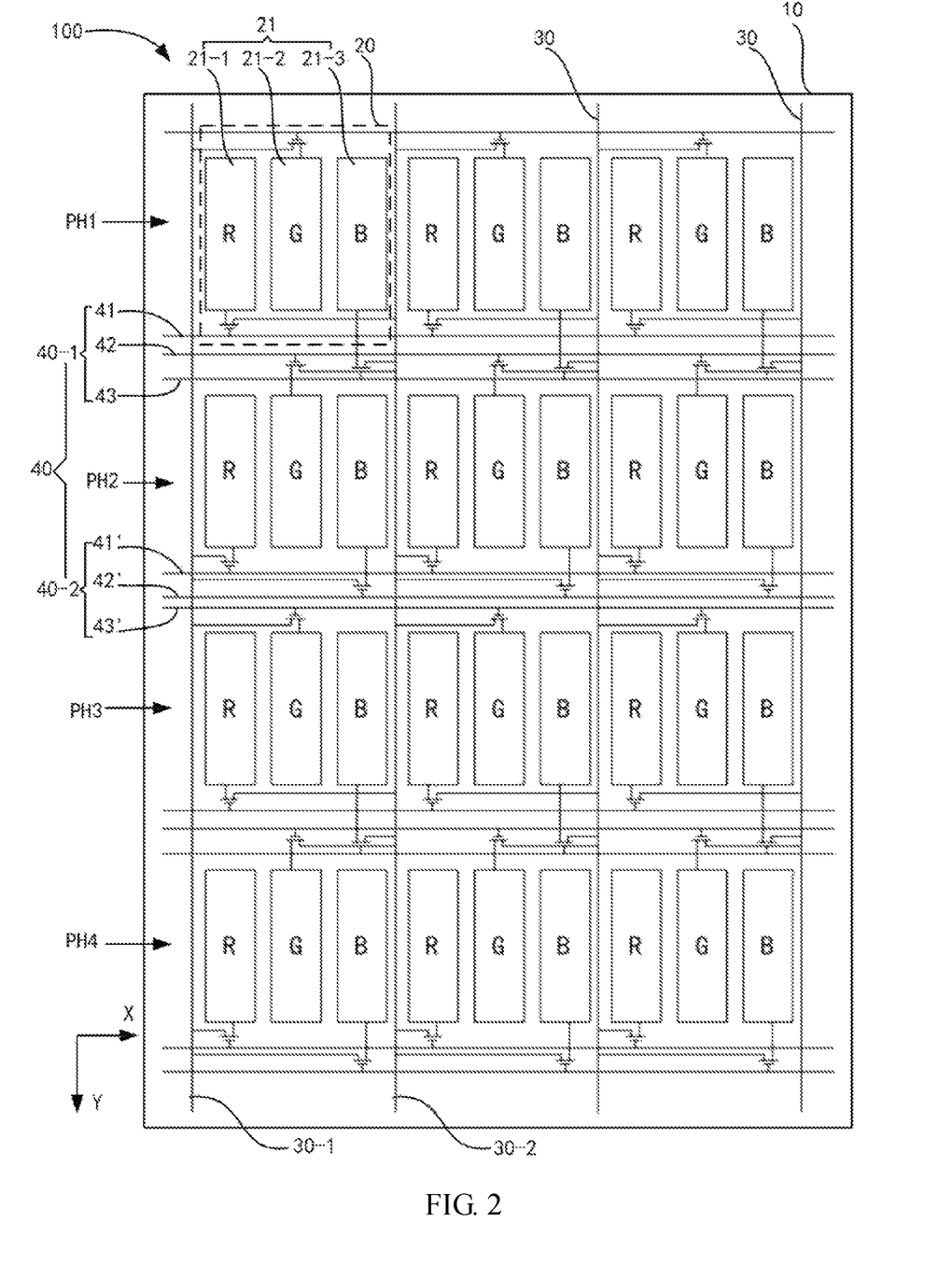
FIG. 2 is a schematic diagram of a first pixel arrangement of the array substrate provided by an embodiment of the present disclosure.

For the problem that the existing LCD panel requires more data lines, which requires more source driver chips, thereby causing the cost of the LCD panel to be higher, embodiments of the present disclosure provide an array substrate to solve the problem of higher cost. Referring to FIG. 2, FIG. 2 is a schematic diagram of a first pixel arrangement of an array substrate provided by an embodiment of the present disclosure, and the array substrate 100 includes a substrate 10 and a plurality of pixels 20, a plurality of scan line groups 40 and a plurality of data lines 30 disposed on the substrate 10.

The plurality of pixels 20 are arranged in an array on the substrate 10. The plurality of pixels 20 are arranged in pixel rows in the first direction X and in pixel columns in the second direction Y. Each of the pixels 20 includes at least three sub-pixels 21 that are arranged along the first direction X. The plurality of scan line groups 40 are provided on the substrate 10. Each of the scan line group 40 includes three sub-scan lines extending along the first direction X and spaced apart along the second direction Y. One of the scan line groups 40 is provided between adjacent two of the pixel rows, and at least two of the sub-pixels 21 in each of the pixels 20 are connected to different two of the sub-scan lines in the one of the scan line groups 40. The plurality of the data lines 30 are provided on the substrate 10 and are spaced apart along the first direction X, and each of the data lines 30 extends along the second direction Y. One of the pixel columns is provided between adjacent two of the data lines 30. At least two of the sub-pixels 21 in each of the pixels 20 are connected to the same one of the data lines 30, which can greatly reduce the number of data lines, reduce the use of source driver chips and reduce costs, thereby solving the technical problem of high cost of the existing LCD panels.

Figure 1:
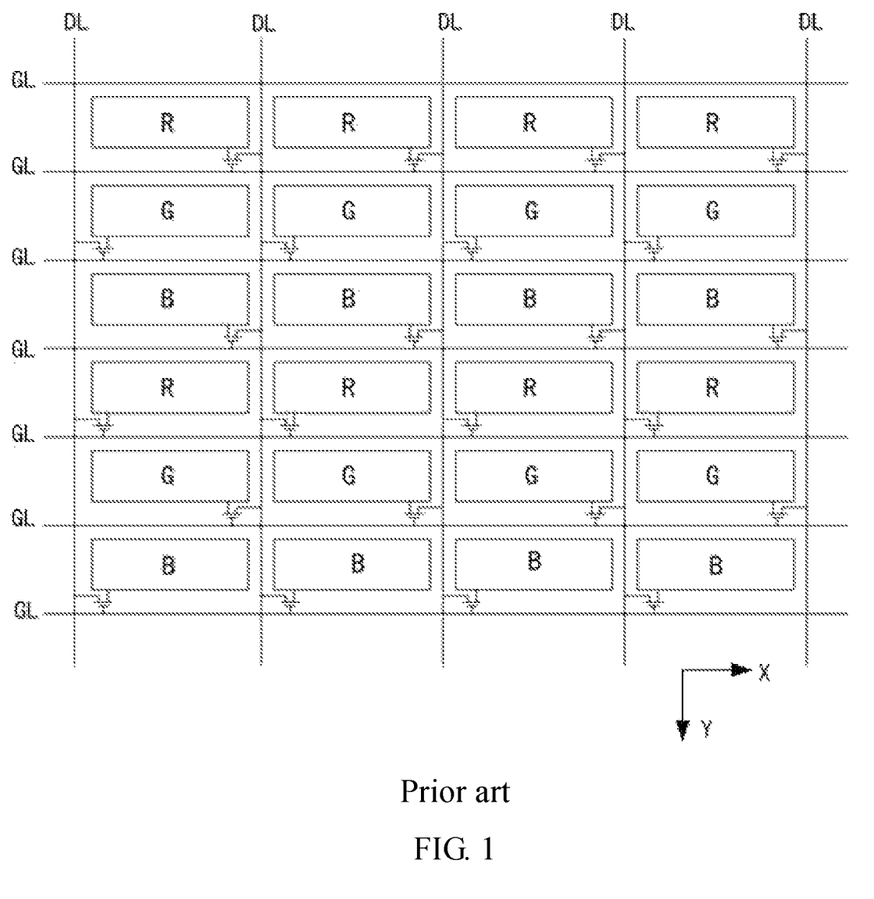
FIG. 1 is a schematic diagram of a pixel arrangement of an existing Tri-gate LCD panel.

It should be noted that although there are technologies in related technologies that can reduce the number of data lines and then reduce source driver chips to reduce costs, such as Tri-gate LCD panels, the Tri-gate LCD panels in related technologies have the problem of horizontal text jaggedness. Regarding the phenomenon of horizontal text jaggedness, the inventor of the present disclosure discovered during research that the LCD panel is composed of square pixels, and the characteristics of the square cause protruding, stepped "burrs" to appear on the edge of the slanted lines, such as strokes of "left falling" and "right falling". Common sub-pixels that can display the same color are generally arranged vertically. In related technology, there is an algorithm optimization "cleartype" for vertically arranged pixels, which is used to improve the text jaggedness phenomenon. However, the sub-pixels in the Tri-gate LCD panel in related technology that are capable of displaying the same color are arranged horizontally. Specifically, referring to FIG. 1 which is a schematic diagram of a pixel arrangement of an existing Tri-gate LCD panel, the Tri-gate LCD panel includes data lines DL spaced apart along the first direction X and extending along the second direction Y, and scan lines GL spaced apart along the second direction Y and extending along the first direction X. The Tri-gate LCD panel has a plurality of pixels arranged in rows and columns, and uses adjacent three scan lines to drive a pixel. Each pixel is composed of three sub-pixels arranged vertically. A plurality of sub-pixels are disposed in the area limited by the scan lines GL and the data lines DL. The three sub-pixels correspond to color resist blocks of different colors, thereby causing the three sub-pixels to display different colors. For example, the three sub-pixels correspond to a red resist block, a green color resist block and a blue color resist block, respectively, colors of the color resist blocks corresponding to the sub-pixels in any row are all the same, so that the sub-pixels that can display the same color are arranged in a row horizontally.

However, there is no algorithm optimization for horizontally arranged pixels in the related technology, which makes the horizontal text jaggedness phenomenon in the existing Tri-gate LCD panel obvious. Especially for the products such as notebook (NB) that mostly display text and are viewed at a close distance, it is particularly important to improve text jaggedness.

To this end, the array substrate 100 provided by the present disclosure not only reduces the number of data lines, reduces the usage of source driver chips, and reduces costs, but also improve text jaggedness by making the three sub-pixels 21 of each of the pixels 20 to arrange along the first direction X and making the sub-pixels 21 arranged in the same column to show the same color.

In addition, for Tri-gate LCD panels, the "difference in light load and heavy load" caused by the pre-charging process of pixel driving is common. For the Tri-gate architecture, since the sub-pixels displaying the same color are placed horizontally, each data line DL will drive the sub-pixels displaying different colors, the difference in light load and heavy load will further lead to a color mixing and color cast. Moreover, the Tri-gate architecture has short charging time and low charging rate, which will further exacerbate the risk of color cast. After in-depth research, the inventor of the present disclosure found that: one way to solve the color mixing and color cast is to make the number of light load pixels and the number of heavy load pixels among the color resists in a frame to be same to even out the color cast, thereby visually eliminating the color mixing and color cast. This requires adding driving sequence to display sub-pixels of different colors. However, the conventional lateral Tri-gate architecture has a single sub-pixel driving sequence, making it difficult to achieve driving diversification.

To this end, the present disclosure provides an array substrate and a display panel to solve the above problems.

Figure 3:
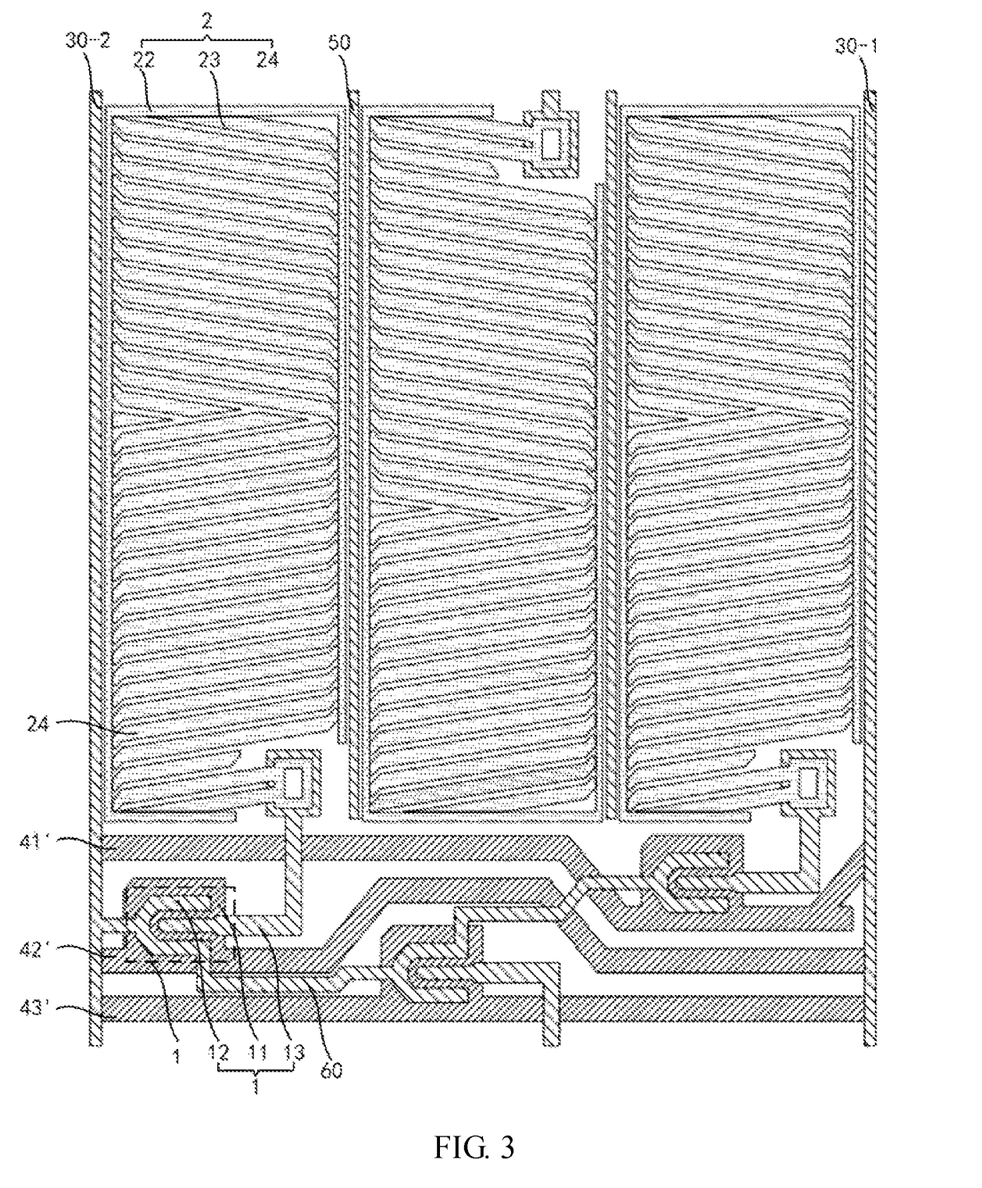
FIG. 3 is a schematic diagram of the detailed structure of a pixel provided by an embodiment of the present disclosure.

Please refer to FIGS. 2 and 3, FIG. 2 is a schematic diagram of a first pixel arrangement of an array substrate provided by an embodiment of the present disclosure, and FIG. 3 is a schematic diagram of a detailed structure of a pixel provided by an embodiment of the present disclosure. The array substrate 100 includes a substrate 10 and a plurality of pixels 20 arranged in an array on the substrate 10. The plurality of pixels 20 are arranged in pixel rows (for example, a first pixel row PH1, a second pixel row PH2, a third pixel row PH3 and a fourth pixel row PH4 schematically shown in FIG. 2, but the present disclosure is not limited thereto, FIG. 2 is only for illustration, and the array substrate 100 of the present disclosure may also include more or less pixel rows) in the first direction X and are arranged in pixel columns (similarly, FIG. 2 schematically shows three pixel columns, but the present disclosure is not limited thereto, the array substrate 100 of the present disclosure may also include more or less pixel columns, and the number of pixel columns may also be greater than the number of pixel rows) in the second direction Y.

Each of the pixels 20 includes at least three sub-pixels 21. For example, each of the pixels 20 includes a first sub-pixel 21-1, a second sub-pixel 21-2 and a third sub-pixel 21-3. The array substrate 100 further includes a color resist layer. The color resist layer includes a plurality of color resist blocks arranged corresponding to the plurality of sub-pixels. The colors of the three resist blocks corresponding to the three sub-pixels 21 are different. For example, the color resist blocks corresponding to the first sub-pixel 21-1, the second sub-pixel 21-2 and the third sub-pixel 21-3 are the red color resist block R, the green color resist block G and the blue color resist block B, respectively. The size of each sub-pixel 21 in the first direction X is smaller than that in the second direction Y. The three sub-pixels 21 are arranged along the first direction X. In the first direction X, the colors of the color resist blocks corresponding to adjacent two of the sub-pixels 21 are different, and in the second direction Y, the colors of the color resist blocks corresponding to the adjacent two of the sub-pixels 21 are same. The first direction X and the second direction Y are different. For example, the first direction X is a row direction, and the second direction Y is a column direction, and the first direction X and the second direction Y are vertical.

The array substrate 100 also includes a plurality of data lines 30 and a plurality of scan line groups 40 provided on the substrate 10. The plurality of the data lines 30 are arranged at intervals along the first direction X and extend along the second direction Y. One of the pixel columns is provided between adjacent two of the data lines 30, and at least two of the sub-pixels 21 in each of the pixels 20 are connected to a same one of the data lines 30. Optionally, in other embodiments, the three sub-pixels 21 in each of the pixels 20 of the pixel column are connected to the same one of the data lines 30.

The plurality of scan line groups 40 are arranged at intervals along the second direction Y and extend along the first direction X. Each of the scan line groups 40 is arranged between adjacent two of the pixel rows. One of the scan line groups 40 is provided between adjacent two of the pixel rows, and at least two sub-pixels 21 in each of the pixels 20 are connected to two different sub-scan lines in the one of the scan line groups 40. The data lines 30 and the scan line groups 40 are insulated and cross to define a plurality of pixel areas, and each of the pixels 20 is located in a corresponding one of the pixel areas.

Optionally, the sub-pixels 21 in one of the pixel rows corresponding to the color resist blocks with the same color are connected to a same one of the sub-scan lines. The voltage polarity on adjacent two of the data lines 30 is different. For example, among the adjacent two of the data lines 30, the voltage polarity on one of the data lines 30 is positive, and the voltage polarity on another one of the data lines 30 is negative. For ease of description, in the following description, the adjacent two of the data lines 30 are defined as a first data line 30-1 and a second data line 30-2.

In each of the pixels 20 located between the adjacent two of the data lines 30, adjacent two of the sub-pixels 21 are connected to the adjacent two of the data lines 30, respectively. For example, in one of the pixels 20, the first sub-pixel 21-1 and the second sub-pixel 21-2 are adjacent. The first sub-pixel 21-1 is connected to the second data line 30-2, and the second sub-pixel 21-2 is connected to the first data line 30-1. In addition, in the adjacent two of the pixels 20 located between the adjacent two of the data lines 30, in the second direction Y, the adjacent two of the sub-pixels 21 are connected to the adjacent two of the data lines 30, respectively. For example, in the second direction Y, in the adjacent two of the first sub-pixels 21-1, one of the first sub-pixels 21-1 is connected to the first data line 30-1, and the another one of the first sub-pixel 21-1 is connected to the second data line 30-2.

In this way, each of the data lines 30 is connected to three sub-pixels 21 in the adjacent two of the pixels 20 in the same pixel column that correspond to the color resist blocks with different colors. The adjacent two of the data lines 30 are connected to three sub-pixels 21 in the adjacent two of the pixels 20 in the same pixel column that correspond to the color resist blocks with different colors, respectively. For example, in the same pixel column, adjacent two of the pixels 20 include two of the first sub-pixels 21-1, two of the second sub-pixels 21-2 and two of the third sub-pixels 21-3. The second sub-pixel 21-2 in one of the pixels 20 and the first sub-pixels 21-1 and the third sub-pixels 21-3 in another one of the pixels 20 are connected to the first data line 30-1. The first sub-pixel 21-1 and the third sub-pixel 21-3 in one of the pixels 20 and the second sub-pixel 21-2 in another one of the pixels 20 are connected to the second data line 30-2.

Each of the scan line group 40 includes three sub-scan lines. The three sub-scan lines all extend along the first direction X and are arranged at intervals along the second direction Y. The color resist blocks corresponding to a same one of the sub-scan lines have the same color, the color resist blocks corresponding to the three sub-scan lines respectively have different colors. The three sub-scan lines include a first sub-scan line 41, a second sub-scan line 42, and a third sub-scan line 43 arranged sequentially along the second direction. The colors of the color resist blocks corresponding to the sub-pixel 21 connected to at least two of the sub-scan lines in each of the scan line groups 40 are different from the colors of the color resist blocks corresponding to the sub-pixel 21 connected to the sub-scan lines in each of the scan line groups 40. That is, the color resist blocks corresponding to two of the first sub-scan lines 41, 41' of adjacent two of the scan line groups 40 have the same color, or, the color resist blocks corresponding to two of the second sub-scan lines 42, 42' of adjacent two of the scan line groups 40 have the same color, or, the color resist blocks corresponding to two of the third sub-scan lines 43, 43' of adjacent two of the scan line groups 40 have the same color.

In this embodiment, by arranging the sub-pixels 21 corresponding to the color resist blocks with same colors vertically, the algorithm optimization in the related art can be used to improve the horizontal text jaggedness phenomenon of the Tri-gate LCD panel, solving the technical problem that the existing Tri-gate LCD panels have horizontal text jaggedness. At the same time, the color resist blocks corresponding to two of the first sub-scan lines 41, 41' of adjacent two of the scan line groups 40 have the same color, or, the color resist blocks corresponding to two of the second sub-scan lines 42, 42' of adjacent two of the scan line groups 40 have the same color, or, the color resist blocks corresponding to two of the third sub-scan lines 43, 43' of adjacent two of the scan line groups 40 have the same color. In this way, by adjusting the connection sequence of the sub-scan lines in the scan line groups 40 and the sub-pixels 21 of different emitting colors, the driving sequence can be diversified, so that when displaying a frame, the number of the light load pixels and that of the heavy load pixels are same to even out the color cast, thereby visually eliminating the color mixing and color cast.

The connection relationship between the scan line group 40 and the sub-pixel 21 will be described in detail below.

One of the scan line groups 40 includes a first scan line group 40-1 and a second scan line group 40-2 that are alternately arranged. The colors of the color resist blocks corresponding to at least two of the sub-scan lines in the first scan line group 40-1 are different from the color of the color resist block corresponding to the sub-scan line in the second scan line group 40-2. That is, the colors of the color resist blocks corresponding to two of the first the sub-scan lines 41 and 41' in the first scan line group 40-1 and the second scan line group 40-2 are same, or, the colors of the color resist blocks corresponding to two of the second the sub-scan lines 42 and 42' are same, or, the colors of the color resist blocks corresponding to two of the third the sub-scan lines 43 and 43' are same. For the convenience of description, in the following description, the three sub-scan lines of the first scan line group 40-1 are defined as the first sub-scan line 41, the second sub-scan line 42 and the third sub-scan line 43, respectively. The three sub-scan lines of the second scan line group 40-2 are defined as the first sub-scan line 41', the second sub-scan line 42' and the third sub-scan line 43', respectively. The first sub-scan line 41, the second sub-scan line 42, the third sub-scan line 43, the first sub-scan line 41', the second sub-scan line 42', and the third sub-scan line 43' are sequentially arranged in the second direction Y.

Optionally, each of the sub-scan lines in each of the scan line groups 40 is connected to the sub-pixels 21 in the same pixel row corresponding to the color resist blocks with same colors. For example, the first sub-scan line 41 is connected to the first sub-pixel 21-1 in the same pixel row, and the second sub-scan line 42 is connected to the second sub-pixel 21-2 in the same pixel row, and the third sub-scan line 43 is connected to the third sub-pixel 21-3 in the same pixel row.

One of the scan line groups 40 is connected to not all of the sub-pixels 21 in adjacent two of the pixel rows. For example, the first scan line group 40-1 is located between adjacent two of the pixel rows. In the first scan line group 40-1, the first sub-scan line 41 is connected to the first sub-pixel 21-1 in the first pixel row PH1, the second sub-scan line 42 is connected to the second sub-pixel 21-2 in the second pixel row PH2, and the third sub-scan line 43 is connected to the third sub-pixel 21-3 in the third pixel row PH1.

In each of the pixels 20 located between adjacent two of the scan line groups 40, adjacent two of the sub-pixels 21 are connected to the adjacent two of the scan line groups 40, respectively. For example, in the pixel 20 located between the first scan line group 40-1 and the second scan line group 40-2, in the adjacent first sub-pixel 21-1 and the second sub-pixel 21-2, the first sub-pixel 21-1 is connected to the sub-scan line in the second scan line group 40-2, and the second sub-pixel 21-2 is connected to the sub-scan line in the first scan line group 40-1.

That is, in the first direction X, adjacent two of the sub-pixels 21 are connected to adjacent two of the data lines 30, respectively, and adjacent two of the sub-pixels 21 are connected to adjacent two of the scan line groups 40, respectively. In the second direction, adjacent two of the sub-pixels 21 are connected to adjacent two of the data lines 30, respectively, and adjacent two of the sub-pixels 21 are connected to adjacent two of the scan line groups 40, respectively.

Optionally, in the second direction Y, the color resist blocks corresponding to the sub-pixels 21 that are respectively connected to the three sub-scan lines in the first scan line group 40-1 are RGB, and the color resist blocks corresponding to the sub-pixels 21 that are respectively connected to the three sub-scan lines in the second scan line group 40-2 are RBG. Specifically, the first sub-scan line 41 in the first scan line group 40-1 is connected to the first sub-pixel 21-1 in the first pixel row PH1, the second sub-scan line 42 in the first scan line group 40-1 is connected to the second sub-pixel 21-2 in the second pixel row PH2, and the third sub-scan line 43 in the first scan line group 40-1 is connected to the third sub-pixel 21-3 in the first pixel row PH1. Then the color resist blocks corresponding to the sub-pixels 21 that are respectively connected to the three sub-scan lines in the first scan line group 40-1 are RGB. Correspondingly, the first sub-scan line 41' in the second scan line group 40-2 is connected to the first sub-pixel 21-1 in the second pixel row PH2, the second sub-scan line 42' in the second scan line group 40-2 is connected to the third sub-pixel 21-3 in the second pixel row PH2, and the third sub-scan line 43' in the second scan line group 40-2 is connected to the second sub-pixel 21-2 in the pixel row PH3, then the color resist blocks corresponding to the sub-pixel 21 that are respectively connected to the three sub-scan lines in the second scan line group 40-2 are respectively connected is RBG.

Referring to FIG. 3, each of the sub-pixels 21 includes at least one transistor 1 and a pixel electrode 2 connected to the transistor 1. The pixel electrode 2 is located on a side of the transistor 1 away from the substrate 10. The pixel electrode 2 extends along the second direction Y. The transistor 1 includes a gate 11, a source 12 and a drain 13. The gate 11 of the transistor 1 is connected to the corresponding sub-scan line, and the source 12 of the transistor 1 is connected to the corresponding one of the data lines 30, and the drain 13 of the transistor 1 is connected to the corresponding pixel electrode 2. The transistor 1 is located between the pixel electrode 2 and the corresponding sub-scan line.

The three transistors 1 connected to the same one of the scan line groups 40 are connected to the same one of the data lines 30. The array substrate 100 further includes a plurality of first connecting wirings 60 for electrically connecting the data lines 30 and the sources 12 of the three transistors 1. The sources 12 of the three transistors 1 are connected to the same one of the first connecting wirings 60 to increase the aperture ratio. In order to further improve the aperture ratio, the pixel electrode 2 includes a frame electrode 22, and a first branch electrode 23 and a second branch electrode 24 with both ends connected to the frame electrode 22. The frame electrode 22 is provided with a notch at an end corresponding to the transistor 1, the first branch electrode 23 is located at a side of the second branch electrode 24 away from the notch, and the first branch electrode 23 and the second branch electrode 24 are axially symmetrical to each other. The gate 11 is integrally provided with the corresponding one of the sub-scan lines, and the gates 11 corresponding to adjacent two of the sub-scan lines in the three sub-scan lines at least partially overlap in the first direction X.

The array substrate 100 further includes a plurality of first common electrode lines 50 extending along the second direction Y. Each of the first common electrode lines 50 is disposed between adjacent two of the sub-pixels 21 in each of the pixels 20.

The principle by which the present disclosure can improve color cast will be explained in detail below.

Continuing to refer to FIG. 2, the embodiments of the present disclosure take the realization of a two-color yellow frame as an example. To display the yellow frame, the first sub-pixels 21-1 and the second sub-pixels 21-2 need to be lit, and all the third sub-pixels 21 are not lit. The sub-scan lines sequentially start scanning along a direction away from the second direction Y. The sub-scan lines shown in FIG. 2 are taken as an example, but the present disclosure is not limited thereto. The array substrate of the present disclosure can also include more or less of the scan line groups 40. In FIG. 2, the sub-scan line connected to the third sub-pixels 21-3 in the fourth pixel row PH4 starts scanning first, and the third sub-pixels 21-3 in the fourth pixel row PH4 are not lit. Then, the sub-scan line connected to the first sub-pixels 21-1 in the fourth pixel row PH4 starts scanning, and the first sub-pixels 21-1 in the fourth pixel row PH4 are heavily loaded. Then, the sub-scan line connected to the third sub-pixels 21-3 in the third pixel row PH3 starts scanning, and the third sub-pixels 21-3 in the third pixel row PH3 are not lit. Then, the sub-scan line connected to the second sub-pixels 21-2 in the fourth pixel row PH4 starts scanning, and the second sub-pixels 21-2 in the fourth pixel row PH4 are heavily loaded. Then, the sub-scan line connected to the first sub-pixels 21-1 in the third pixel row PH3 starts scanning, and the first sub-pixels 21-1 in the third pixel row PH3 are lightly loaded. Then, the sub-scan line connected to the second sub-pixels 21-2 in the third pixel row PH3 starts scanning, and the second sub-pixels 21-2 in the third pixel row PH3 are lightly loaded. Then, the sub-scan line connected to the third sub-pixels 21-3 in the second pixel row PH2 starts scanning, and the third sub-pixels 21-3 in the second pixel row PH2 are not lit. Then, the sub-scan line connected to the first sub-pixels 21-1 in the second pixel row PH2 starts scanning, and the first sub-pixels 21-1 in the second pixel row PH2 are heavily loaded. Then, the sub-scan line connected to the third sub-pixels 21-3 in the first pixel row PH1 starts scanning, and the third sub-pixels 21-3 in the first pixel row PH1 are not lit. Then, the sub-scan line connected to the second sub-pixels 21-2 in the second pixel row PH2 starts scanning, and the second sub-pixels 21-2 in the second pixel row PH2 are heavily loaded. Then, the sub-scan line connected to the first sub-pixels 21-1 in the first pixel row PH1 starts scanning, and the first sub-pixels 21-1 in the first pixel row PH1 are lightly loaded. Then, the sub-scan line connected to the second sub-pixels 21-2 in the first pixel row PH1 starts scanning, and the second sub-pixels 21-2 in the first pixel row PH1 are lightly loaded. That is, in the frame shown in FIG. 2, the first sub-pixels 21-1 and the second sub-pixels 21-2 in the first pixel row PH1 and the third pixel row PH3 are lightly loaded, and the first sub-pixels 21-1 and the second sub-pixels 21-2 in the second pixel row PH2 and the fourth pixel row PH4 are heavily loaded. In this way, the number of the light load pixels 20 and that of the heavy load pixels 20 are same, which evens out the color cast and thus visually eliminates the color mixing and color cast.

Figure 4:
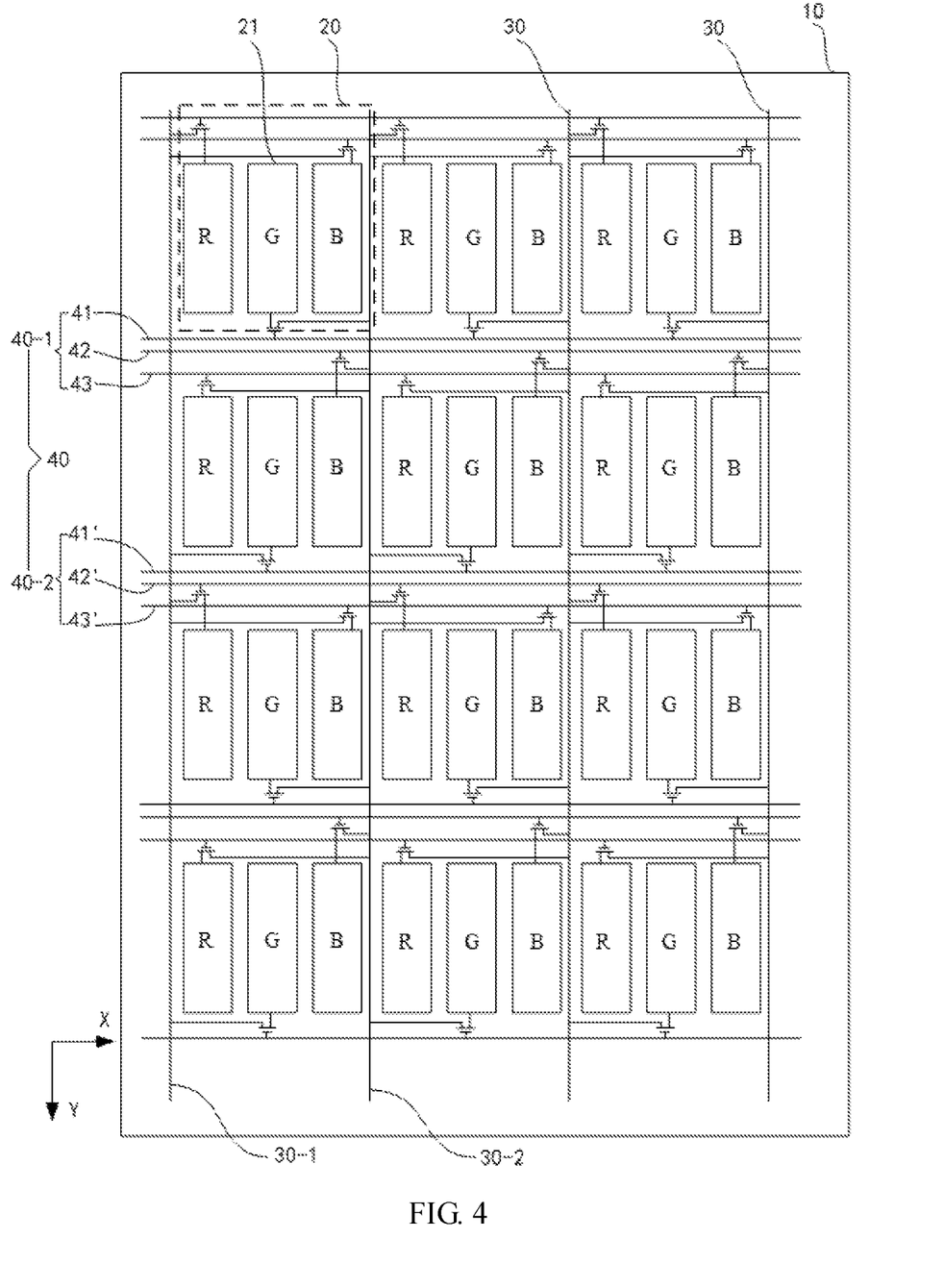
FIG. 4 is a schematic diagram of a second pixel arrangement of the array substrate provided by an embodiment of the present disclosure.
Figure 5:
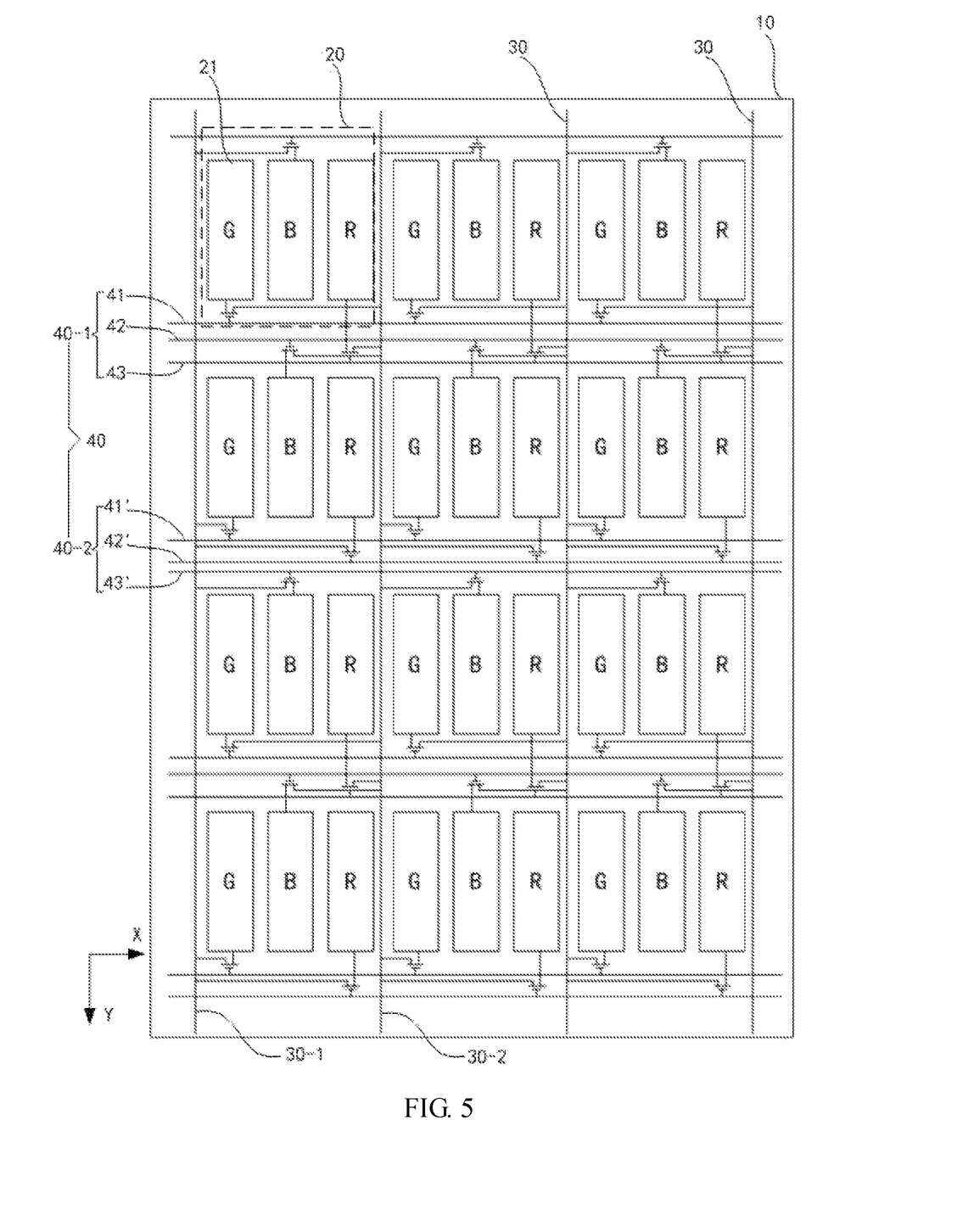
FIG. 5 is a schematic diagram of a third pixel arrangement of the array substrate provided by an embodiment of the present disclosure.
Figure 6:
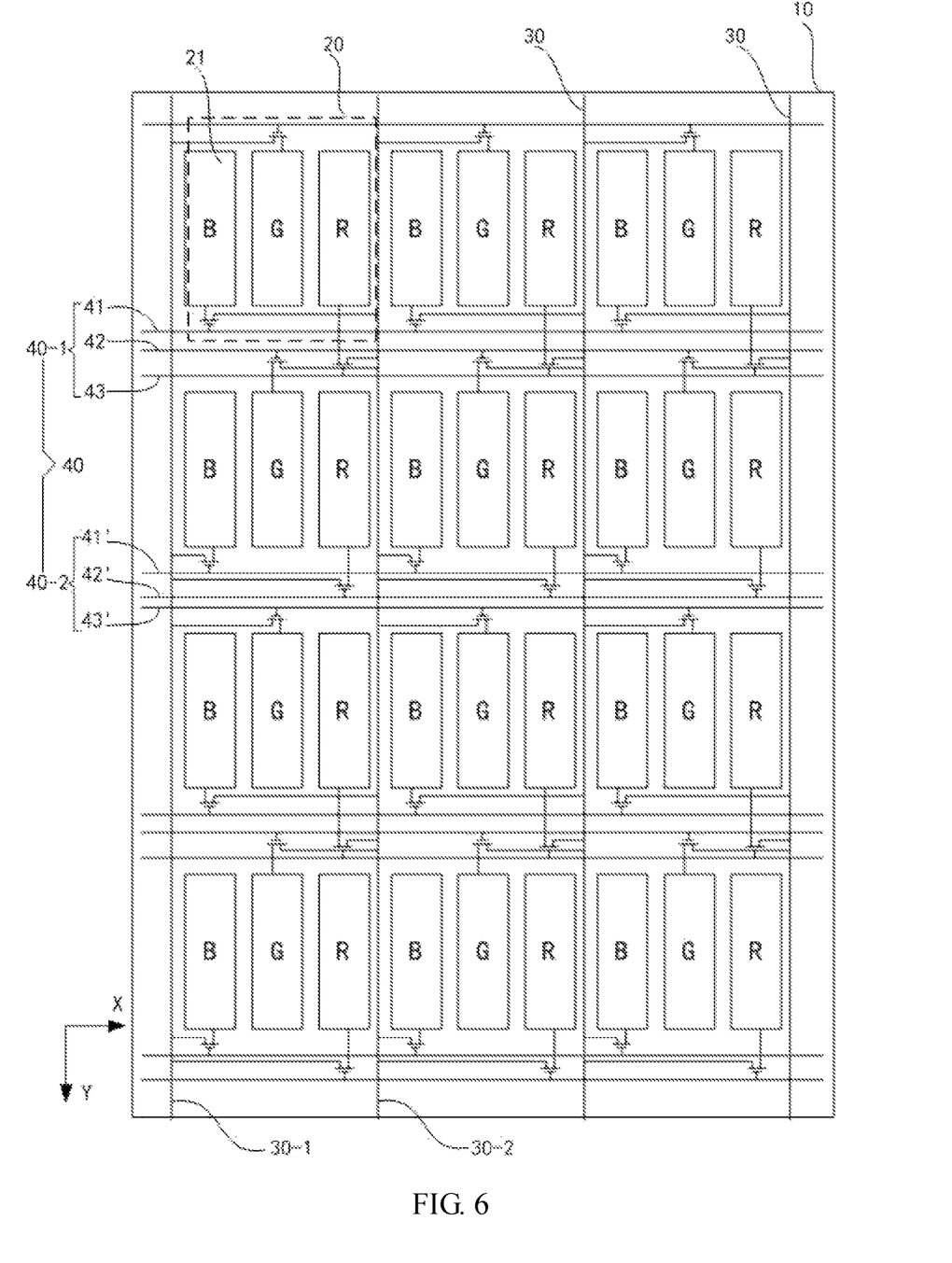
FIG. 6 is a schematic diagram of a fourth pixel arrangement of the array substrate provided by an embodiment of the present disclosure.

In an embodiment, referring to FIGS. 2 to 4, FIG. 4 is a schematic diagram of a second pixel arrangement of an array substrate provided by an embodiment of the present disclosure. What is different from the above embodiment is that in the second direction Y, the color resist blocks corresponding to the sub-pixels 21 respectively connected to the three sub-scan lines in the first scan line group 40-1 are GBR, the color resist blocks corresponding to the sub-pixels 21 respectively connected to the three sub-scan lines in the second scan line group 40-2 are GBR. In this way, it can also be achieved that the number of the light load pixels 20 and that of the heavy load pixels 20 are same, which makes the color cast uniform, thereby visually eliminating the color mixing and color cast. Please refer to the above embodiments for other explanations, which will not be described again here.

In an embodiment, referring to FIGS. 2 to 5, FIG. 5 is a schematic diagram of a third pixel arrangement of an array substrate provided by an embodiment of the present disclosure. What is different from the above embodiment is that the arrangement order of each of the pixels 20 in the first direction X is the second sub-pixel 21-2, the third sub-pixel 21-3 and the first sub-pixel 21-1, then in the second direction Y, the color resist blocks corresponding to the sub-pixels 21 respectively connected to the three sub-scan lines in the first scan line group 40-1 are GBR, and the color resist blocks corresponding to the sub-pixels 21 respectively connected to the three sub-scan lines in the second scan line group 40-2 are GRB. In this way, it can also be achieved that the number of the light load pixels 20 and that of the heavy load pixels 20 are same, which makes the color cast uniform, thereby visually eliminating the color mixing and color cast. Please refer to the above embodiments for other explanations, which will not be described again here.

In an embodiment, referring to FIGS. 2 to 6, FIG. 6 is a schematic diagram of a fourth pixel arrangement of an array substrate provided by an embodiment of the present disclosure. What is different from the above embodiment is that the arrangement order of each of the pixels 20 in the first direction X is the third sub-pixel 21-3, the second sub-pixel 21-2 and the first sub-pixel 21-1, then in the second direction Y, the color resist blocks corresponding to the sub-pixels 21 respectively connected to the three sub-scan lines in the first scan line group 40-1 are BGR, and the color resist blocks corresponding to the sub-pixels 21 respectively connected to the three sub-scan lines in the second scan line group 40-2 are BRG. In this way, it can also be achieved that the number of the light load pixels 20 and that of the heavy load pixels 20 are same, which makes the color cast uniform, thereby visually eliminating the color mixing and color cast. Please refer to the above embodiments for other explanations, which will not be described again here.

In other embodiments, in the second direction Y, the three sub-scan lines in the first scan line group 40-1 are connected to the first sub-pixels, the second sub-pixels, and the third sub-pixels, respectively, or connected to the first sub-pixels, the third sub-pixels, and the second sub-pixels, respectively, or connected to the second sub-pixels, the first sub-pixels, and the third sub-pixels, respectively, or connected to the second sub-pixels, the third sub-pixels, and the first sub-pixels respectively, or connected to the third sub-pixels, the second sub-pixels, and the first sub-pixels, respectively, or connected to the third sub-pixels, the first sub-pixels, and the second sub-pixels, respectively. The three sub-scan lines in the second scan line group 40-2 are connected to the first sub-pixels, the second sub-pixels, and the third sub-pixels, respectively, or connected to the first sub-pixels, the third sub-pixels, and the second sub-pixels, respectively, or connected to the second sub-pixels, the first sub-pixels, and the third sub-pixels, respectively, or connected to the second sub-pixels, the third sub-pixels, and the first sub-pixels respectively, or connected to the third sub-pixels, the second sub-pixels, and the first sub-pixels, respectively, or connected to the third sub-pixels, the first sub-pixels, and the second sub-pixels, respectively.

Based on the same inventive concept, the embodiments of the present disclosure also provide a display panel. The display panel includes an array substrate and an opposed substrate arranged oppositely each other. The array substrate includes:

a substrate;

a plurality of pixels arranged in an array on the substrate, the plurality of pixels are arranged in pixel rows in a first direction and are arranged in pixel columns in a second direction, each of the pixels includes at least three sub-pixels, and the three sub-pixels are arranged along the first direction;

a plurality of scan line groups provided on the substrate, each of the scan line groups includes three sub-scan lines extending along the first direction and spaced apart along the second direction, one of the scan line groups is provided between adjacent two of the pixel rows, and at least two of the sub-pixels in each of the pixels are connected to different two of the sub-scan lines in the one of the scan line groups;

a plurality of data lines provided on the substrate and spaced apart along the first direction, each of the data lines extends along the second direction, one of the pixel columns is provided between adjacent two of the data lines, and at least two of the sub-pixels in each of the pixels are connected to a same one of the data lines;

the opposed substrate includes a color resist layer, the color resist layer includes a plurality of color resist blocks provided corresponding to the plurality of the sub-pixels, and three of the color resist blocks corresponding to the three sub-pixels have different colors; the color resist blocks corresponding to the same one of the sub-scan lines have the same color, the color resist blocks corresponding to the three sub-scan lines respectively have different colors, the scan line groups include a plurality of first sub-scan lines, a plurality of second sub-scan lines, and a plurality of third sub-scan lines, and the three sub-scan lines include a first sub-scan line, a second sub-scan line, and a third sub-scan line arranged sequentially along the second direction; the color resist blocks corresponding to two of the first sub-scan lines of adjacent two of the scan line groups have the same color, or, the color resist blocks corresponding to two of the second sub-scan lines of adjacent two of the scan line groups have the same color, or, the color resist blocks corresponding to two of the third sub-scan lines of adjacent two of the scan line groups have the same color.

It can be known from to the above embodiments that:

The present disclosure provides an array substrate and a display panel. The array substrate includes a plurality of pixels arranged in an array on a substrate and a plurality of scan line groups arranged between adjacent two of the pixel rows. Each of the pixels includes at least three sub-pixels, and the three sub-pixels are arranged along the first direction. In the first direction, the colors of the color resist blocks corresponding to adjacent two of the sub-pixels are different, and in the second direction, the colors of the color resist blocks corresponding to adjacent two of the sub-pixels are same. Each of the scan line groups includes three sub-scan lines, and each of the sub-scan lines is connected to the sub-pixels corresponding to the color resist blocks with the same color. Each of the scan line groups is connected to the three sub-pixels corresponding to color resist blocks with different colors, thus forming a Tri-gate LCD panel in which the sub-pixels corresponding to the color resist blocks with the same color are vertically arranged, so that the algorithm optimization in the related technology can be used to improve the horizontal text jaggedness phenomenon of the Tri-gate LCD panel, and solve the technical problem of the horizontal text jaggedness phenomenon in the existing Tri-gate LCD panel. At the same time, the color resist blocks corresponding to two of the first sub-scan lines of adjacent two of the scan line groups have the same color, or, the color resist blocks corresponding to two of the second sub-scan lines of adjacent two of the scan line groups have the same color, or, the color resist blocks corresponding to two of the third sub-scan lines of adjacent two of the scan line groups have the same color. In this way, by adjusting the connection sequence of the scan lines and sub-pixels of different light-emitting colors in the scan line groups, the driving sequence can be diversified, so that when displaying a frame, the number of light load pixels and that of heavy load pixels are same, making the color cast uniform and visually eliminating the color mixing and color cast.

In the above embodiments, each embodiment is described with its own emphasis. For parts that are not described in detail in a certain embodiment, please refer to the relevant descriptions of other embodiments.

The embodiments of the present disclosure have been introduced in detail above. Specific examples are used to illustrate the principles and implementation methods of the present disclosure. The description of the above embodiments is only used to help understand the technical solutions and core ideas of the present disclosure. Those skilled in the art should understand that it is still possible to modify the technical solutions recorded in the foregoing embodiments, or to equivalently replace some of the technical features. However, these modifications or substitutions do not cause the essence of the corresponding technical solutions to depart from the scope of the technical solutions of the embodiments of the present disclosure.

What is claimed is:

1. An array substrate comprising:
    a substrate;
    a plurality of pixels arranged in an array on the substrate, wherein the plurality of pixels are arranged in pixel rows in a first direction and are arranged in pixel columns in a second direction, each of the pixels comprises at least three sub-pixels, and the three sub-pixels are arranged along the first direction;
    a plurality of scan line groups provided on the substrate, wherein each of the scan line groups comprises three sub-scan lines extending along the first direction and spaced apart along the second direction, one of the scan line groups is provided between adjacent two of the pixel rows, and at least two of the sub-pixels in each of the pixels are connected to different two of the sub-scan lines in the one of the scan line groups;
    a plurality of data lines provided on the substrate and spaced apart along the first direction, wherein each of the data lines extends along the second direction, one of the pixel columns is provided between adjacent two of the data lines, and at least two of the sub-pixels in each of the pixels are connected to a same one of the data lines, and
    in each of the pixels located between the adjacent two of the data lines, each of adjacent two of the sub-pixels in the first direction are connected to the adjacent two of the data lines, respectively and in the adjacent two of the pixels located between the adjacent two of the data lines, the adjacent two of the sub-pixels in the second direction are connected to the adjacent two of the data lines, respectively.

2. The array substrate according to claim 1, wherein the array substrate further comprises a color resist layer, the color resist layer comprises a plurality of color resist blocks provided corresponding to the plurality of the sub-pixels, and three of the color resist blocks corresponding to the three sub-pixels have different colors;
    the color resist blocks corresponding to a same one of the sub-scan lines have a same color, the color resist blocks corresponding to the three sub-scan lines respectively have different colors, the scan line groups comprise a plurality of first sub-scan lines, a plurality of second sub-scan lines, and a plurality of third sub-scan lines, and the three sub-scan lines comprise a first sub-scan line, a second sub-scan line, and a third sub-scan line arranged sequentially along the second direction;

the color resist blocks corresponding to two of the first sub-scan lines of adjacent two of the scan line groups have a same color, or, the color resist blocks corresponding to two of the second sub-scan lines of adjacent two of the scan line groups have a same color, or, the color resist blocks corresponding to two of the third sub-scan lines of adjacent two of the scan line groups have a same color.

3. The array substrate according to claim 2, wherein adjacent two of the sub-pixels in each of the pixels are connected to two of the data lines adjacent to the each of the pixels, respectively.

4. The array substrate according to claim 3, wherein in adjacent two of the pixels between adjacent two of the data lines, two sub-pixels are connected to the adjacent two of the data lines, respectively, and the two sub-pixels are adjacent to each other in the second direction.

5. The array substrate according to claim 2, wherein the sub-pixels in one of the pixel rows that correspond to the color resist blocks with same colors are connected to a same one of the sub-scan lines.

6. The array substrate according to claim 5, wherein the scan line groups are connected to not all of the sub-pixels in adjacent two of the pixel rows.

7. The array substrate according to claim 6, wherein adjacent two of the sub-pixels in one of the pixels are connected to two of the scan line groups adjacent to the one of the pixels, respectively.

8. The array substrate according to claim 2, wherein the adjacent two of the sub-pixels are connected to adjacent two of the scan line groups; and the adjacent two of the sub-pixels are connected to adjacent two of the scan line groups, respectively.

9. The array substrate according to claim 2, wherein the scan line groups comprise a first scan line group and a second scan line group arranged alternately, the color resist blocks corresponding to two of the first sub-scan lines of the first scan line group and the second scan line group have a same color, or, the color resist blocks corresponding to two of the second sub-scan lines of the first scan line group and the second scan line group have a same color, or, the color resist blocks corresponding to two of the third sub-scan lines of the first scan line group and the second scan line group have a same color.

10. The array substrate according to claim 9, wherein each of the pixels comprises a first sub-pixel, a second sub-pixel, and a third sub-pixel arrayed in the first direction, the first sub-pixel, the second sub-pixel, and the third sub-pixel correspond to a red color resist, a green color resist, and a blue color resist, respectively, and in the second direction, three sub-scan lines in the first scan line group are connected to the first sub-pixel, the second sub-pixel, and the third sub-pixel, respectively, or to the first sub-pixel, the third sub-pixel, and the second sub-pixel, respectively, or to the second sub-pixel, the first sub-pixel, and the third sub-pixel, respectively, or to the second sub-pixel, the third sub-pixel, and the first sub-pixel, respectively, or to the third sub-pixel, the second sub-pixel, and the first sub-pixel, respectively, or to the third sub-pixel, the first sub-pixel, and the second sub-pixel, respectively; and three sub-scan lines in the second scan line group are connected to the first sub-pixel, the second sub-pixel, and the third sub-pixel, respectively, or to the first sub-pixel, the third sub-pixel, and the second sub-pixel, respectively, or to the second sub-pixel, the first sub-pixel, and the third sub-pixel, respectively, or to the second sub-pixel, the third sub-pixel, and the first sub-pixel, respectively, or to the third sub-pixel, the second sub-pixel, and the first sub-pixel, respectively, or to the third sub-pixel, the first sub-pixel, and the second sub-pixel, respectively.

11. The array substrate according to claim 10, wherein in the second direction, the three the sub-scan lines in the first scan line group are connected to the first sub-pixel, the second sub-pixel, and the third sub-pixel, respectively, and the three sub-scan lines in the second scan line group are connected to the first sub-pixel, the third sub-pixel, and the second sub-pixel, respectively.

12. The array substrate according to claim 10, wherein a size of each of the sub-pixels in the first direction is smaller than a size of each of the sub-pixels in the second direction.

13. The array substrate according to claim 12, wherein each of the sub-pixels comprises at least one transistor and a pixel electrode connected to the transistor, the pixel electrode extends in the second direction, the transistor comprises a gate, a source, and a drain, the gate is connected to a corresponding one of the sub-scan lines, the source is connected to a corresponding one of the data lines, the drain is connected to the pixel electrode; the transistor is disposed between the pixel electrode and the corresponding one of the sub-scan lines.

14. The array substrate according to claim 13, wherein three transistors connected to one of the scan line groups are connected to a same one of the data lines, and the array substrate further comprises a plurality of first connecting wirings for electrically connecting the same one of the data lines to sources of the three transistors, and the sources of the three transistors are connected to a same one of the first connecting wirings.

15. The array substrate according to claim 13, wherein the pixel electrode comprises a frame electrode, and a first branch electrode and a second branch electrode both ends of which are connected to the frame electrode, the frame electrode is provided with a notch at an end corresponding to the transistor, the first branch electrode is located at a side of the second branch electrode away from the notch, and the first branch electrode and the second branch electrode are axially symmetrical to each other.

16. The array substrate according to claim 13, wherein the gate is integrally provided with the corresponding one of the sub-scan lines, and gates corresponding to adjacent two of the sub-scan lines in the three sub-scan lines at least partially overlap in the first direction.

17. The array substrate according to claim 13, wherein the array substrate further comprises a plurality of first common electrode lines extending in the second direction, and each of the first common electrode lines is disposed between adjacent two of the sub-pixels in each of the pixels.

18. A display panel comprising an array substrate and an opposed substrate disposed oppositely each other, wherein the array substrate comprises:

a substrate;

a plurality of pixels arranged in an array on the substrate, wherein the plurality of pixels are arranged in pixel rows in a first direction and are arranged in pixel columns in a second direction, each of the pixels comprises at least three sub-pixels, and the three sub-pixels are arranged along the first direction;

a plurality of scan line groups provided on the substrate, wherein each of the scan line groups comprises three sub-scan lines extending along the first direction and spaced apart along the second direction, one of the scan line groups is provided between adjacent two of the pixel rows, and at least two of the sub-pixels in each of the pixels are connected to different two of the sub-scan lines in the one of the scan line groups;

a plurality of data lines provided on the substrate and spaced apart along the first direction, wherein each of the data lines extends along the second direction, one of the pixel columns is provided between adjacent two of the data lines, and at least two of the sub-pixels in each of the pixels are connected to a same one of the data lines;

the opposed substrate comprises a color resist layer, wherein the color resist layer comprises a plurality of color resist blocks provided corresponding to the plurality of the sub-pixels, and three of the color resist blocks corresponding to the three sub-pixels have different colors;

the color resist blocks corresponding to a same one of the sub-scan lines have a same color, the color resist blocks corresponding to the three sub-scan lines respectively have different colors, the scan line groups comprise a plurality of first sub-scan lines, a plurality of second sub-scan lines, and a plurality of third sub-scan lines, and the three sub-scan lines comprise a first sub-scan line, a second sub-scan line, and a third sub-scan line arranged sequentially along the second direction;

the color resist blocks corresponding to two of the first sub-scan lines of adjacent two of the scan line groups have a same color, or, the color resist blocks corresponding to two of the second sub-scan lines of adjacent two of the scan line groups have a same color, or, the color resist blocks corresponding to two of the third sub-scan lines of adjacent two of the scan line groups have a same color, and wherein in each of the pixels located between the adjacent two of the data lines, each of adjacent two of the sub-pixels in the first direction are connected to the adjacent two of the data lines, respectively and in the adjacent two of the pixels located between the adjacent two of the data lines, the adjacent two of the sub-pixels in the second direction are connected to the adjacent two of the data lines, respectively.

19. The display panel according to claim 18, wherein adjacent two of the sub-pixels in each of the pixels are connected to two of the data lines adjacent to the each of the pixels, respectively.

20. The display panel according to claim 19, wherein in adjacent two of the pixels between adjacent two of the data lines, two sub-pixels are connected to the adjacent two of the data lines, respectively, and the two sub-pixels are adjacent to each other in the second direction.

* * * * *